United States Patent [19]
Kim et al.

[11] Patent Number: 5,929,574
[45] Date of Patent: Jul. 27, 1999

[54] MOIRE CLEAR CIRCUIT

[75] Inventors: Hyun-Suk Kim; Hyung-Suk Park, both of Kyungki-do, Rep. of Korea

[73] Assignee: SamSung Electronics Co., Ltd., Kyungki-do, Rep. of Korea

[21] Appl. No.: 08/885,991

[22] Filed: Jun. 30, 1997

[30] Foreign Application Priority Data

| Jun. 29, 1996 | [KR] | Rep. of Korea | 96/25841 |
| Aug. 13, 1996 | [KR] | Rep. of Korea | 96/33588 |
| Dec. 16, 1996 | [KR] | Rep. of Korea | 96/66368 |

[51] Int. Cl.$^6$ ............................... H04N 5/21; H04N 3/22
[52] U.S. Cl. ........................... 315/370; 315/371; 348/806
[58] Field of Search .................... 315/370, 371, 315/368.17; 348/806

[56] References Cited

U.S. PATENT DOCUMENTS

| 4,887,010 | 12/1989 | Fujimura | 315/370 |
| 4,983,879 | 1/1991 | Kawaguchi . | |
| 5,107,188 | 4/1992 | Rindal | 315/370 |
| 5,241,237 | 8/1993 | Misono et al. . | |
| 5,430,502 | 7/1995 | Yamazaki et al. | 348/806 |
| 5,440,353 | 8/1995 | Yamazaki et al. | 348/806 |
| 5,473,223 | 12/1995 | Murakami . | |
| 5,619,094 | 4/1997 | Vriens . | |
| 5,635,803 | 6/1997 | Fujimura et al. . | |
| 5,672,939 | 9/1997 | Hsiesh | 315/1 |
| 5,767,632 | 6/1998 | Yoshida et al. | 315/370 |
| 5,777,441 | 7/1998 | Yoshida et al. | 315/371 |
| 5,777,698 | 7/1998 | Park | 348/809 |

*Primary Examiner*—Edward P. Westin
*Assistant Examiner*—Shane R. Gardner
*Attorney, Agent, or Firm*—Robert E. Bushnell, Esq.

[57] ABSTRACT

A Moire clear circuit of a display device includes a vertical center regulating terminal connected to a vertical deflection coil of a vertical output circuit and determining the direction of a current flowing in the vertical deflection coil to regulate the vertical center of an image displayed, and a moire clear regulating terminal connected to the vertical center regulating terminal to trigger a vertical synchronization signal received and turning on/off the signal applied to the vertical center regulating terminal according to a vertical period to move the vertical center up and down.

10 Claims, 12 Drawing Sheets

MOIRE CLEAR CIRCUIT

CLAIM FOR PRIORITY

This application makes reference to, incorporates the same herein, and claims all benefits accruing under 35 U.S.C. § 119 from applications for MOIRE CLEAR CIRCUIT earlier filed in the Korean Industrial Property Office on Jun. 29, 1996, Aug. 13, 1996 and Dec. 16, 1996, and there duly assigned Ser. Nos. 96-25841, 96-33588, and 96-66368, respectively, a copy of which application is annexed hereto.

BACKGROUND OF THE INVENTION

1. Technical Field

The present invention relates to a Moire clear circuit, and more particularly, relates to a Moire clear circuit for visually canceling Moire interference phenomena on color cathode ray tube "CRT" display monitors for multimode operations.

2. Related Art

Generally, a display device such as a CRT type of monitor is a peripheral device which processes information data received from an information data system such as a computer system and provides a visual display of processed information data on a screen. Such a monitor is typically available in either black and white known as monochrome monitor or high resolution color known as color graphics adapter (CGA), video graphics adapter (VGA) and enhanced graphics adapter (EGA) monitor. In all display devices, the video signal is typically received from a video card installed in an information data system in accordance with vertical and horizontal synchronization signals for a visual display.

Conventional color display device generally includes a micro-processor which receives the vertical and horizontal synchronization signals from the video card to control the visual display of information data on a screen, and vertical and horizontal deflection circuits which respectively receive the vertical and horizontal synchronization signals to perform vertical and horizontal deflection, such that an electron beam generated from an electron gun of a CRT is deflected in a regular sequence from an upper left portion to a lower right portion of a phosphor deposited CRT screen by way of a deflection yoke in order to form an image. The shadow mask has a multiple of minute apertures or slots in a predetermined regular pattern related systematically to the pattern of triads of the luminescent phosphor dots on the phosphor deposited screen, and allows the electron beam corresponding to three primary colors, for example, red, green and blue generated from an electron gun configured of three electrodes for the three primary colors to selectively strike its respective phosphor dot.

Since the electron beam generated from the electron gun forms substantially equally spaced scanning lines when sweeping across the phosphor deposited screen, shades delimited by the regularly patterned minute apertures or slots in the perforated shadow mask and the similarly regularly spaced scanning lines interfere with each other resulting in the appearance of undesirable Moire patterns on the screen of the color display device.

From an operating standpoint, the Moire interference phenomenon poses a serious aesthetic problem, since the best electron beam focus and highest image resolution results in unacceptable noticeable Moire patterns. One traditional solution to the Moire interference problem is to reduce the apertures of the shadow mask and phosphor dot pitch which raise the effective spatial frequency of the CRT, thereby raising the Moire beat frequency so that it is less visible. This solution, however, results in a lower resolution image displayed on a CRT which is inherently capable of significantly higher resolution. Another known solution is to increase a spot size of the electron beam, which also results in a lower resolution image displayed on the CRT and is harmful to the eye sight of the user. Recent solution to the Moire interference problem is to shift the phase of a video sync signal such that the phase of each video scan line is shifted relative to the phase of each immediately preceding video scan line in order to cancel the Moire pattern which occurs on the same video scan line without sacrificing image resolution or brightness of the displayed image. Contemporary Moire cancellation techniques which incorporate different solutions to the Moire interference problem are disclosed, for example, in U.S. Pat. No. 4,887,010 for *Display Device Using Shadow Mask CRT* issued to Fujimura, U.S. Pat. No. 4,983,879 for *Shadow Mask Type Color Cathode Ray Tube With Shadow Mask Effective To Minimize The Appearance Of Moire Patterns* issued to Kawaguchi, U.S. Pat. No. 5,107,188 for *Method And Apparatus For Cancellation Of Moire Interference In Color Cathode Ray Tube Displays* issued to Rindall, U.S. Pat. No. 5,241,237 for *Electron Gun And Cathode-Ray Tube* issued to Misono et al., U.S. Pat. No. 5,430,502 for *Apparatus For Eliminating Moire Pattern Effects Resulting From The Use Of Different Display Resolution With A Fixed Size Shadow Mask* issued to Yamazaki et al., U.S. Pat. No. 5,440,353 for *Display Monitor Using Moire Cancellation Circuit* issued to Yamazaki et al., U.S. Pat. No. 5,473,223 for *Vertical Deflection Waveform Generating Apparatus* issued to Murakami, U.S. Pat. No. 5,619,094 for *Color Cathode Ray Tube And Display Device With Reduced Moire* issued to Vriens, and U.S. Pat. No. 5,635,803 for *Display Device With Shadow Mask CRT* issued to Fujimura et al.

For recent Moire cancellation technique which incorporates a Moire clear circuit for shifting the phase of a video sync signal such as disclosed in U.S. Pat. No. 5,107,188 issued to Rindall and U.S. Pat. No. 5,440,353, as I have observed however, is that internal circuitry is complex and cost prohibitive. Moreover, such a complexity often results in difficulty in vertical synchronization for operation of overall system. Accordingly, it is my observation that further improvement in Moire clear circuit construction can be contemplated.

SUMMARY OF THE INVENTION

It is therefore an objective of the present invention to provide an improved Moire clear circuit for operation in a multimode color CRT-type of monitor.

It is also an object to provide a Moire clear circuit for applying a pulse twice a vertical period of a vertical center circuit and clears the Moire effect by controlling the Moire interference and the direction of the vertical center.

These and other objects of the present invention can be achieved by a Moire clear circuit of a display device which includes a vertical center regulating terminal connected to a vertical deflection coil of a vertical output circuit, for determining the direction of a current flowing in the vertical deflection coil to regulate a vertical center of an image displayed on a screen; and a Moire clear regulating terminal connected to the vertical center regulating terminal to trigger a vertical synchronization signal received therefrom and turning on/off the signal applied to the vertical center regulating terminal according to a vertical period to move the vertical center up and down for clearing a Moire effect on the image displayed on the screen.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
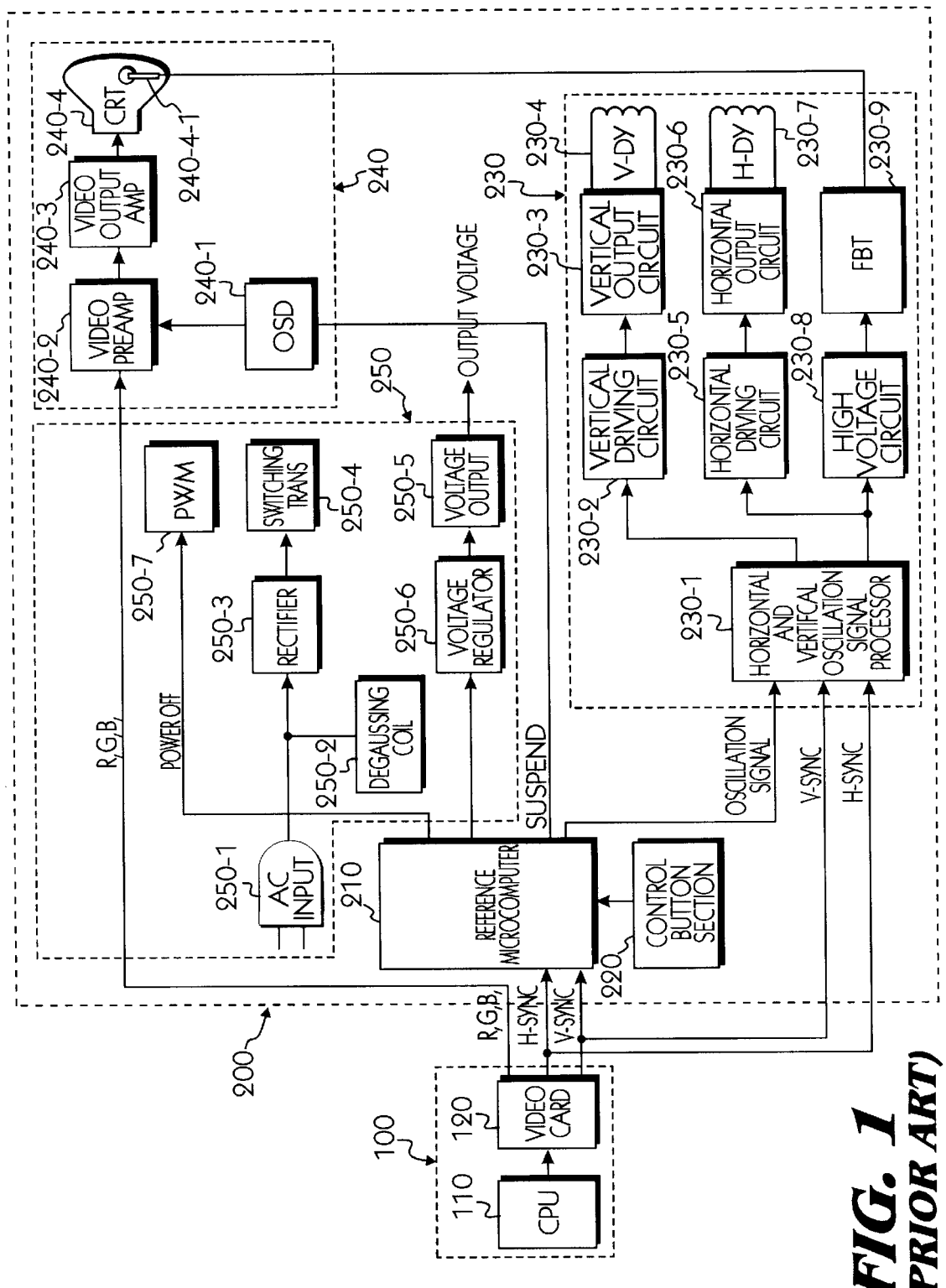
FIG. 1 illustrates internal circuitry of a contemporary color display monitor.

Referring now to the drawings and particularly to FIG. 1, which illustrates an internal circuitry of a typical CRT-type of display monitor. As shown in FIG. 1, the CRT-type of display monitor includes a monitor 200 which receive RGB image signals such as red, green and blue primary color signals and respective vertical and horizontal synchronization signal from a video card installed in a personal computer (PC) 100 for a visual display.

PC 100 includes a central processing unit (CPU) 110 for processing a keyboard signal entered by a user and generating its output signal, and a video card 120 for processing image data received from the CPU 110 as RGB image signals and generating horizontal and vertical synchronization signals H-SYNC and V-SYNC to synchronize the processed image data and RGB image signals.

Monitor 200, which receives the RGB image signals, horizontal and vertical synchronization signals H-SYNC and V-SYNC from the video card 120, comprises a microcomputer 210 for receiving the horizontal and vertical synchronization signals H-SYNC and V-SYNC, a control button section 220 for generating an image adjusting signal to control an image displayed on the monitor and transfer the monitor image adjusting signal, a horizontal and vertical output circuit section 230 for receiving the monitor image adjusting signal from the microcomputer 210 and a reference oscillation signal to synchronize a raster, a video circuit section 240 for displaying the image signal received from the video card 120, and a power supply circuit section 250 for supplying a driving voltage to the microcomputer 210, the horizontal and vertical output circuit section 230 and the video circuit section 240.

The horizontal and vertical output circuit section 230 includes a horizontal and vertical oscillation signal processor 230-1, a vertical driving circuit 230-2 which is typically constructed by a one-step vertical amplifier, a vertical output circuit 230-3, a vertical deflection yoke V-DY 230-4, a horizontal driving circuit 230-5, a horizontal output circuit 230-6, a horizontal deflection yoke H-DY 230-7, a high voltage circuit 230-8, and a flyback transformer FBT 230-9.

The video circuit section 240 includes an on-screen display OSD section 240-1, a video preamplifier 240-2, a video output amplifier 240-3 and a CRT 240-4 for providing a visual display of image signal received from the video card 120.

The power supply circuit section 250 includes an AC input 250-1, a degaussing coil 250-2, a rectifier 250-3, a switching transformer 250-4, a voltage output 250-5, a voltage regulator 250-6, and a pulse width modulation (PWM) 250-7 for supplying a driving voltage to the microcomputer 210, the horizontal and vertical output circuit section 230 and the video circuit section 240.

The operation of the typical CRT-type of display monitor will now be described with reference to FIG. 1 hereinbelow.

First, the microcomputer 210 receives the horizontal and vertical synchronization signals H-SYNC and V-SYNC from the video card 120. When the control button section 220 transfers a monitor image adjusting signal to the microcomputer 210, the microcomputer 210 generates an image regulating signal to regulate the image displayed on the monitor according to the image adjusting signal. That is, the microcomputer 210 generates the image regulating signal and reference oscillation signal according to the monitor image adjusting signal received from the control button section 220.

Upon receipt of the image regulating signal and reference oscillation signal from the microcomputer 210, the horizontal and vertical oscillation signal processor 230-1 controls the switching speed of a sawtooth wave generator according to the horizontal and vertical synchronization signals H-SYNC and V-SYNC transferred from the video card 120. The vertical driving circuit 230-2 which is controlled by the horizontal and vertical oscillation signal processor 230-1 receives a vertical oscillation signal to generate a driving current. An emitter follower type vertical driving circuit is usually employed as the vertical driving circuit 230-2 to transfer an input signal into the base terminal of a transistor and generates an output voltage from the emitter terminal, thereby operating a linear improvement rather than a gain.

The vertical output circuit 230-3 which is coupled to receive the current signal from the vertical driving circuit 230-2 generates a sawtooth wave current corresponding to the vertical synchronous pulse flowing through a V-DY 230-4 to determine a vertical scanning period. The horizontal driving circuit 230-5 receives a horizontal oscillation signal from the horizontal and vertical oscillation signal processor 230-1.

The horizontal driving circuit 230-5 supplies a current enough to turn on/off a horizontal output circuit 230-6. The horizontal driving circuit 230-5 is generally divided into two types: in-phase type whose output terminal is turned on when a drive terminal is on, and out-of-phase type whose output terminal is off with the drive terminal turned on.

When applied with a current from the horizontal driving circuit 230-5, the horizontal output circuit 230-6 generates a sawtooth wave current to a H-DY 230-7 to determine a horizontal scanning period. To supply a stable DC voltage to the anode of a CRT 240-4, high voltage is generated even with a low collector pulse by using a feedback collector through the flyback transformer (FBT) 230-9 and high harmonics by the distribution capacity of a leakage inductance and high-voltage circuit 230-8. Thus high voltage can be applied to the terminal 240-4-1 of the CRT 240-4.

CRT 240-4 which is installed in the image signal processing unit 240 displays an image signal in the following procedures. The OSD section 240-1 first generates an OSD gain signal to the video preamp 240-2 according to the image adjusting signal of the microcomputer 210. Upon receipt of the OSD gain signal from the OSD section 240-1 and the RGB image signals from the video card 120, the video preamp 240-2 amplifies the RGB image signals and OSC image signals with a low voltage to maintain a constant voltage level. For example, a signal below 1 $V_{pp}$ can be amplified into 4 to 6 $V_{pp}$.

The video main amplifier 240-3 supplies each picture element with energy of 40 to 60 $V_{pp}$ amplified from 4 to 6 $V_{pp}$. The RGB image signals and OSD image signals amplified by the video main amplifier 240-4 are applied to the cathode of the CRT 240-3, thereby displaying the RGB image signals on the screen of the monitor.

The power circuit section 250 for supplying a driving voltage to display the RGB image signals and OSD image signals on the screen receives an alternating current (AC) through an input terminal 250-1. The degaussing coil 250-2 receives an AC from the AC input terminal 250-1 to restore the colors on the screen which are spread due to earth magnetic field or other external factors. To restore the primary colors, an AC is applied to the degaussing coil 250-2 instantaneously for 2 to 8 seconds to weaken the magnetic field formed on a shadow mask. The AC is rectified through an AC rectifier 250-3 and applied to a switching trans 250-4. The switching trans 250-4 is to supply all sorts of driving voltages required in the monitor 200 through a voltage output terminal 250-5.

When the vertical synchronization signal V-SYNC is not applied from the video card 120, the microcomputer 210 transfers a suspend mode signal to a voltage regulator 250-6 to interrupt a deflection voltage. The pulse width modulation (PWM) section 250-7 generates a globular wave pulse to drive the switching unit and increase and/or decrease a conduction time through a variation in the pulse width, thereby stabilizing the output voltage. If the microcomputer 210 senses neither the horizontal nor vertical synchronization signal H-SYNC nor V-SYNC, the microcomputer 210 generates a power off mode signal to the PWM section 250-7. The power off mode signal transferred to the PWM section 250-7 is converted into a LOW level voltage to interrupt the voltage supplied to the monitor 200, so that the power consumption by the monitor can be curtailed.

Figure 2:
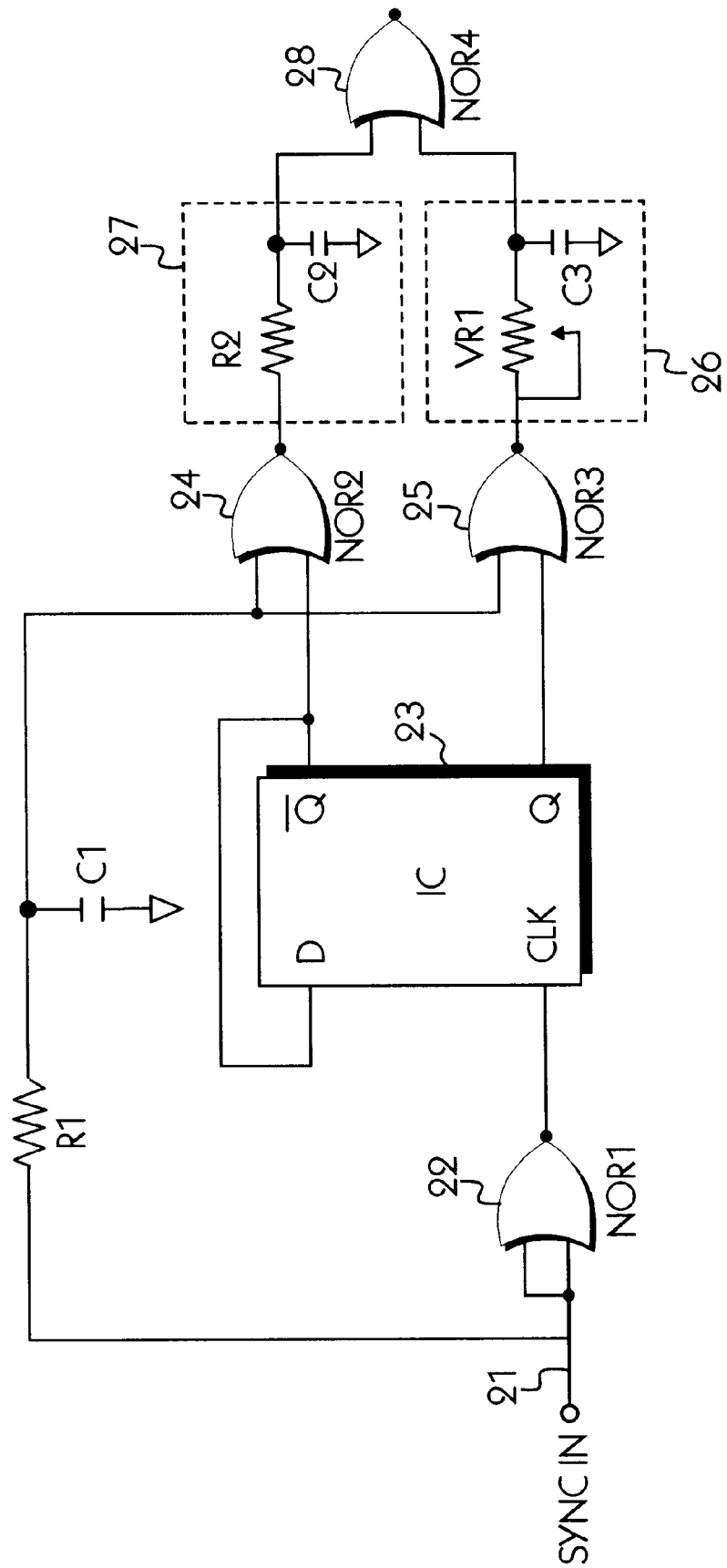
FIG. 2 is a circuit diagram of a contemporary moire cancellation circuit of the color display monitor as shown in FIG. 1.

Contemporary display monitor, as I have noted earlier, is generally plagued with a Moire interference pattern which is resulted from interference between the shadow mask and scanning pattern. Moire interference pattern may be eliminated by contemporary Moire clear circuit as shown in FIG. 2 which uses a series of first, second, third and fourth NOR gates NOR122, NOR224, NOR325, NOR428, a counter IC 23, a variable delay RC circuit 26, and a fixed delay RC circuit 27.

First NOR gate NOR1 22 inverts a synchronization signal SYNC in 21 transferred from the video card 120 as shown in FIG. I through its both input terminals. The synchronization signal SYNC IN 21 from the video card 120 is delayed by a resistance R1 and a capacitor C1, and transferred into second and third NOR gates NOR224 and NOR325.

The output signal of the first NOR gate NOR122 is transmitted to the clock terminal CLK of a counter IC 23 comprising a D flip-flop. The counter IC 23 has a Q-bar output which is connected to a D input (data input terminal) and generates a toggled logic signal of HIGH or LOW level through a Q output.

The Q-bar output is connected to the other input of the second NOR gate NOR2-24 and the Q output is to the other input of the third NOR gate NOR325. The output signal of the second NOR gate NOR224 is fed into a fourth NOR gate NOR4-28 through the fixed variable RC circuit 27 comprising a resistance R2 and a capacitor C2. The output signal of the third NOR gate NOR3-25 is transmitted to the other input of the fourth NOR gate NOR4 through the variable RC circuit 26 comprising a variable resistance VR1 and a capacitor C3. Receiving the output signals of the second and third NOR gates NOR2-24 and NOR3-25, the outputs of the fourth NOR gate NOR4-28 generates the synchronization signal SYNC delayed.

Figure 3:
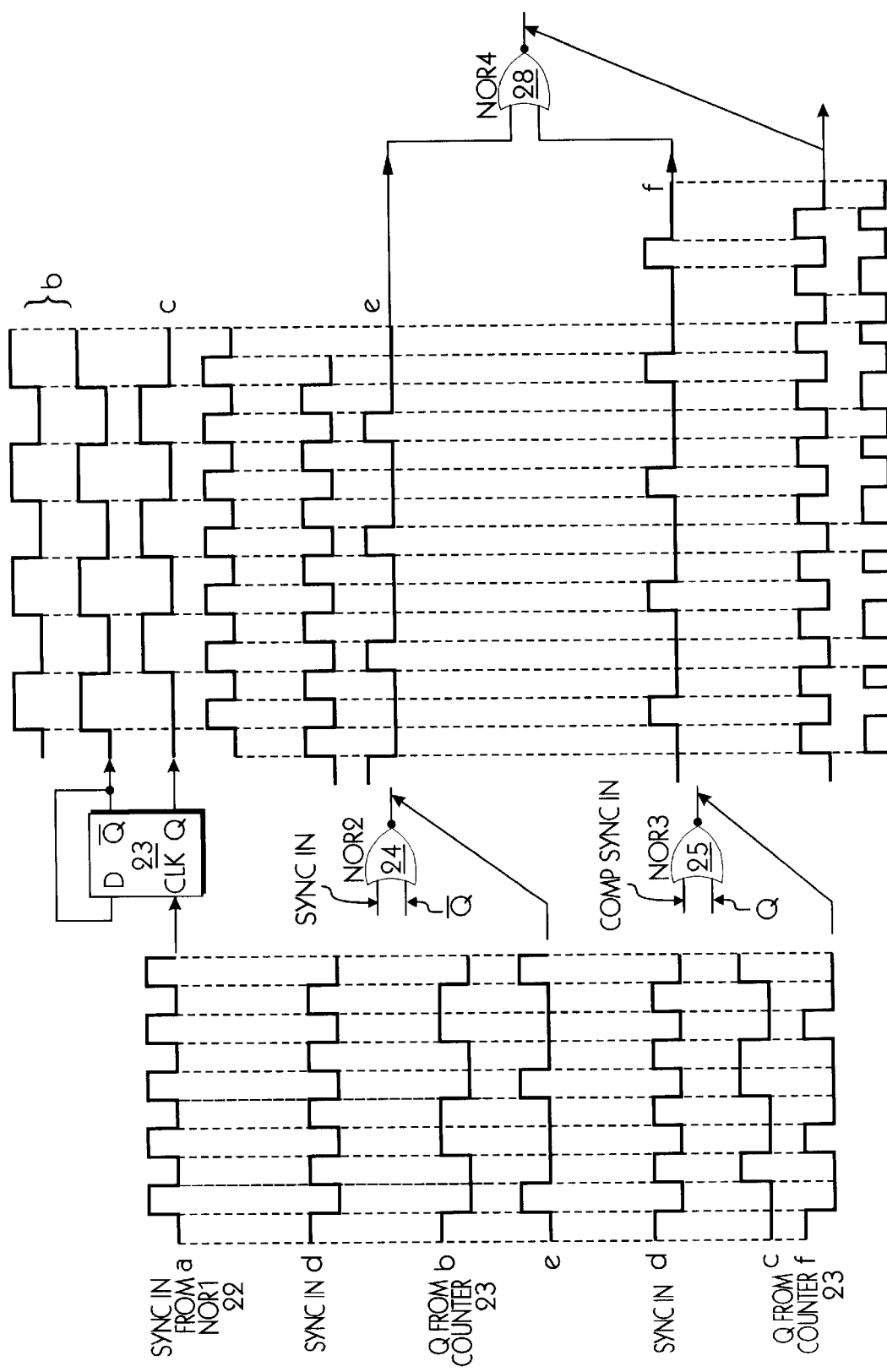
FIG. 3 is a waveform diagram of input and output signals of the contemporary Moire clear circuit as shown in FIG. 2.

FIG. 3 is a waveform diagram of the input and output signals of each section of the Moire clear circuit as shown in FIG. 2. Referring to FIG. 3, "a" represents the waveform of a synchronization signal SYNC IN 21 inverted by the first NOR gate NOR122 and transferred to the clock terminal of the counter IC. "b" represents the waveform of a pulse transferred from the D input and Q-bar output of the counter IC 23 to an input of the second NOR gate NOR224. "c" represents the waveform of a pulse from the Q output of the counter IC 23 to an input of the third NOR gate NOR325.

"d" is the waveform of a synchronization signal SYNC IN 21 delayed through the resistance R1 and capacitor C1 and transferred to the input of the second NOR gate NOR224. The two signals of "b" and "d" are fed into the second NOR gate NOR224 and generated as "e". When the two input signals are both LOW according to the logic operation characteristic of the second NOR gate NOR224, the output signal of "e" is HIGH; otherwise, the output signal is LOW.

One input of the third NOR gate NOR325 receives a synchronization signal SYNC IN 21 delayed through an RC filter comprising the resistance R1 and capacitor C1 as shown in the waveform "d". The other input of the third NOR gate NOR325 receives the output signal of the Q output of the counter IC 23, as "c". The two signals of "c" and "d" are fed into the third NOR gate NOR325, generated into HIGH when the two input signals are both LOW according to the logic operation characteristic of the third NOR gate NOR325.

The output signals of the second and third NOR gates NOR2 and NOR3 having the respective waveforms "e" and "f" are transmitted into the two input of the fourth NOR gate NOR4 via the resistance R2 and variable resistance VR1, and capacitors C2 and C3, respectively. The fourth NOR gate NOR428 generates the output signals of "h" and "i". The waveform "i" is produced from an input signal delayed by user's regulating the variable resistance VR1.

When the two signals of "e" and "f" are both LOW, the width of the HIGH logic output signal is changed. The output signal of the third NOR gate NOR325 varies in a time constant according to the change of the variable resistance VR1. The time applied to the fourth NOR gate NOR428 is delayed more than the time for the fourth NOR gate NOR428 to receive the output signal of the second NOR gate NOR2-24. Thereby delayed synchronization signal SYNC IN 21 results in a phase shift of the electron beam on the CRT.

The Moire effect is cleared by delaying the center of the vertical synchronization signal in the left and right directions successively to force the vertical center to be trembled. However, such a contemporary Moire clear circuit is constructed so complex that the vertical synchronization can be realized with error in the circuit's operation.

Figure 4:
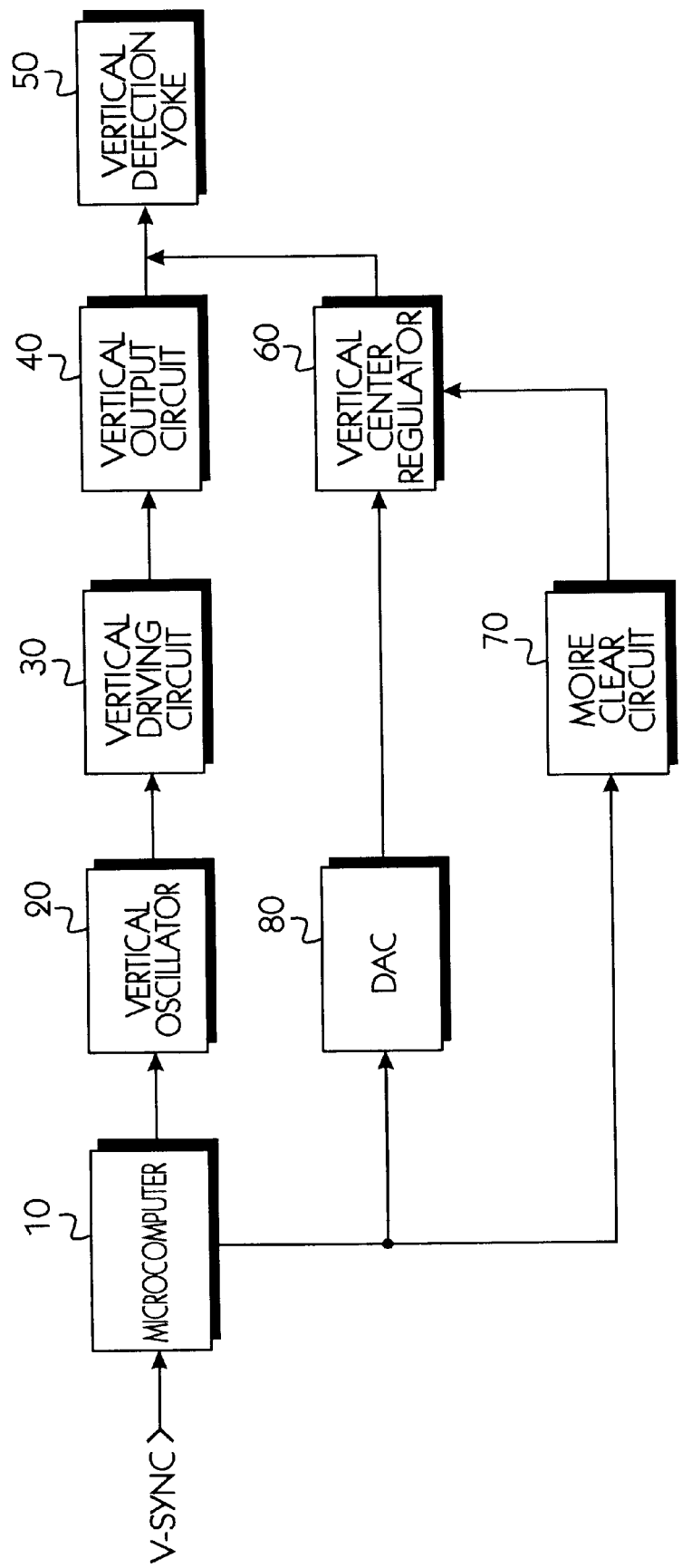
FIG. 4 is a block diagram of a vertical deflection circuit section constructed in accordance with a first preferred embodiment of the present invention.

Turning now to FIG. 4 which illustrates a vertical deflection circuit section of the CRT-type of display monitor constructed in accordance with a first preferred embodiment of the present invention. Referring to FIG. 4, the vertical deflection circuit section includes a microcomputer 10, a vertical oscillator 20, a vertical driving circuit 30, a vertical output circuit 40, a vertical deflection yoke V-DY 50, a digital-to-analog converter DAC 80, a vertical center regulator 60, and a Moire clear circuit 70.

The microcomputer 10 receives a vertical synchronization signal through a video cable connected to a computer system such as a personal computer (not shown) and generates a designated DC voltage corresponding to a vertical frequency. Vertical oscillator or oscillation circuit 20 generates a sawtooth wave by charging or discharging a capacitor using the output voltage of the microcomputer 10. Vertical output circuit 40 generates a linear deflection current by using a mirror integration. Vertical driving circuit 30 maintains a constant central voltage of the vertical output circuit 40. Vertical deflection yoke 50 forms a magnetic field by flowing the current applied from the vertical output circuit 40 in a coil to control the distance between an electron beam and an shadow mask and speed at which the electron beam reaches the shadow mask. Vertical center regulator 60 regulates the vertical center of an image displayed by overlapping the DC current with the deflection yoke and varying the size and direction of the DC current, and the Moire clear circuit 70 regulates the operational period of the vertical center regulator 60 by means of a half period of the vertical synchronization signal to attenuate a moire effect.

Figure 5:
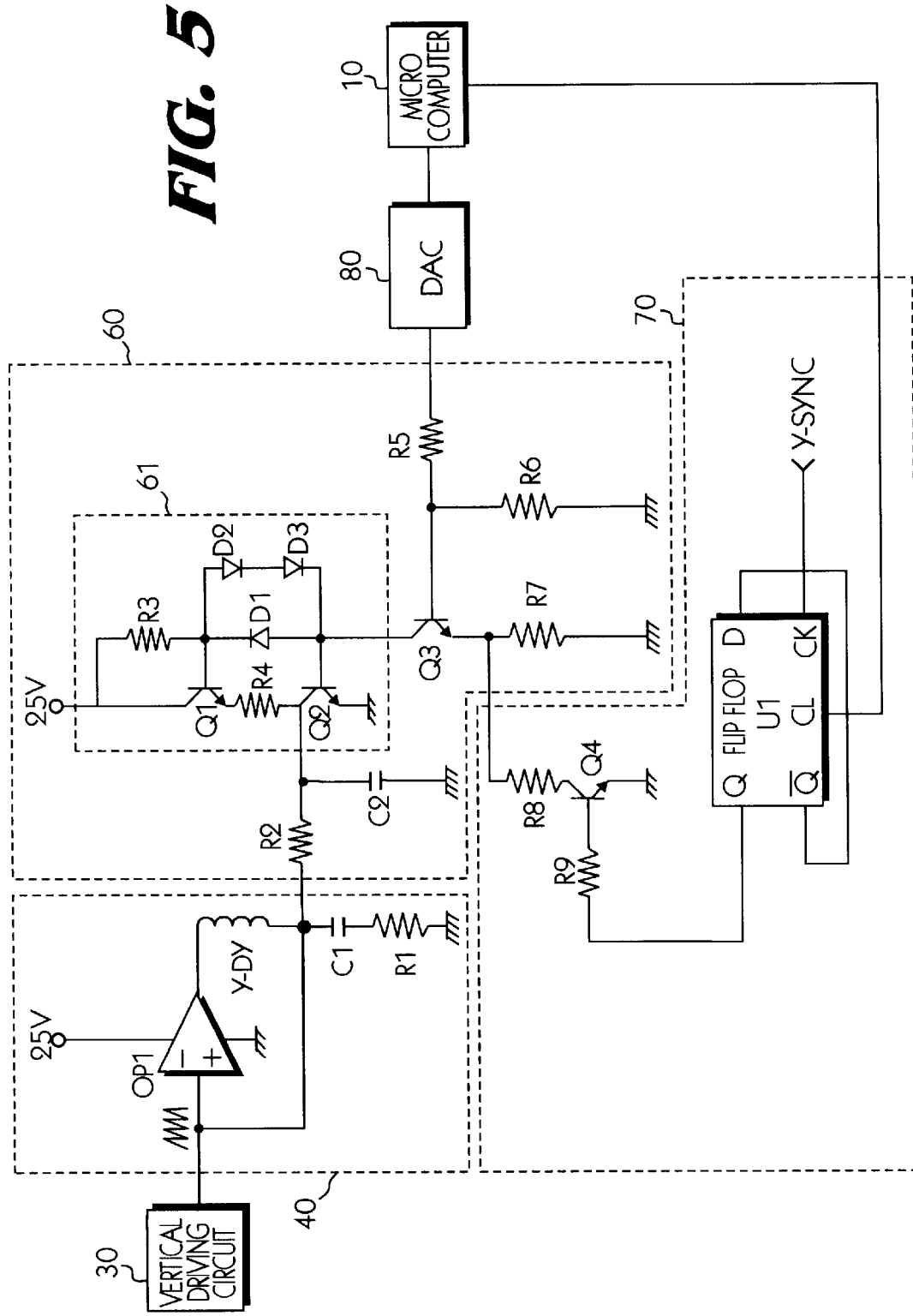
FIG. 5 is a detailed circuit diagram of the vertical output circuit, vertical center regulator and Moire clear circuit as shown in FIG. 4.

FIG. 5 illustrates a detailed circuit diagram of the Moire clear circuit as shown in FIG. 4. The vertical output circuit 40 comprises a vertical deflection yoke V-DY for receiving the output voltage of the first operational amplifier OP1, and a capacitor C1 and a resistance R1 which are connected to the deflection yoke V-DY in series.

Vertical center regulator 60 comprises resistances R5 and R6 for detecting and dividing a vertical center regulating signal of the microcomputer 10 via the DAC 80, and a transistor Q3 having a base for receiving the divided voltage and an emitter connected to a ground through the resistance R7. Between the collector of the transistor Q3 and that of a transistor Q1 connected a diode D1 and a resistance R3 in series. Diodes D2 and D3 for preventing a reverse voltage are connected in series between the base of the transistor Q1 and that of a transistor Q2. The emitter of the transistor Q I is connected to the transistor Q2 through the resistance R4. Between the emitter of the transistor Q2 and the resistance R4 is connected a capacitor C2 and a resistance R2 for the purpose of controlling the direction of a current flowing the deflection yoke V-DY.

Moire clear circuit 70 comprises a transistor Q4 having a collector connected to the emitter of the transistor Q3 through a resistance R8 and an emitter connected to a ground, and a first flip-flop U1 whose output is connected to the base of the transistor Q4 via a resistance R9. The first flip-flop U1 comprises a clear terminal for receiving the output of the DAC 80, a clock terminal for receiving a vertical synchronization signal, and a Q output connected to a data input D. The output signal Q of the first flip-flop U1 is transferred to the base of the transistor Q4 via the resistance R9.

The operation of the vertical center regulator 60 as shown in FIG. 5 will be described hereinbelow. First, a vertical conversion signal is transmitted from the microcomputer 10 into the base of the transistor Q3 via the DAC 80. The resistances R5 and R6 are to divide the voltage. The collector voltage of the transistor Q3 is changed by the DC voltage applied to the base of the transistor Q3 and converted into a current by the transistors Q1 and Q2. This determines the direction of the current flowing the deflection yoke V-DY to change the vertical center and attenuate the moire effect.

Triggering the vertical synchronization signal V-SYNC, the output Q of the first flip-flop U1 generates a HIGH or LOW signal, which is detected by the resistance R9 and transferred to the base of the transistor Q4. When the transistor Q4 is turned on with the output signal, it is determined whether the resistance R8 connected to the collector of the transistor Q4 is operated in parallel with the resistance R7 connected to the emitter of the transistor Q3, or the resistance R7 is solely operated. The bias voltage of the emitter of the transistor Q3 is changed, thereby moving the vertical center up and down. The Moire clear circuit 70 has one operational period per two periods of the vertical synchronization signal V-SYNC.

Figure 6:
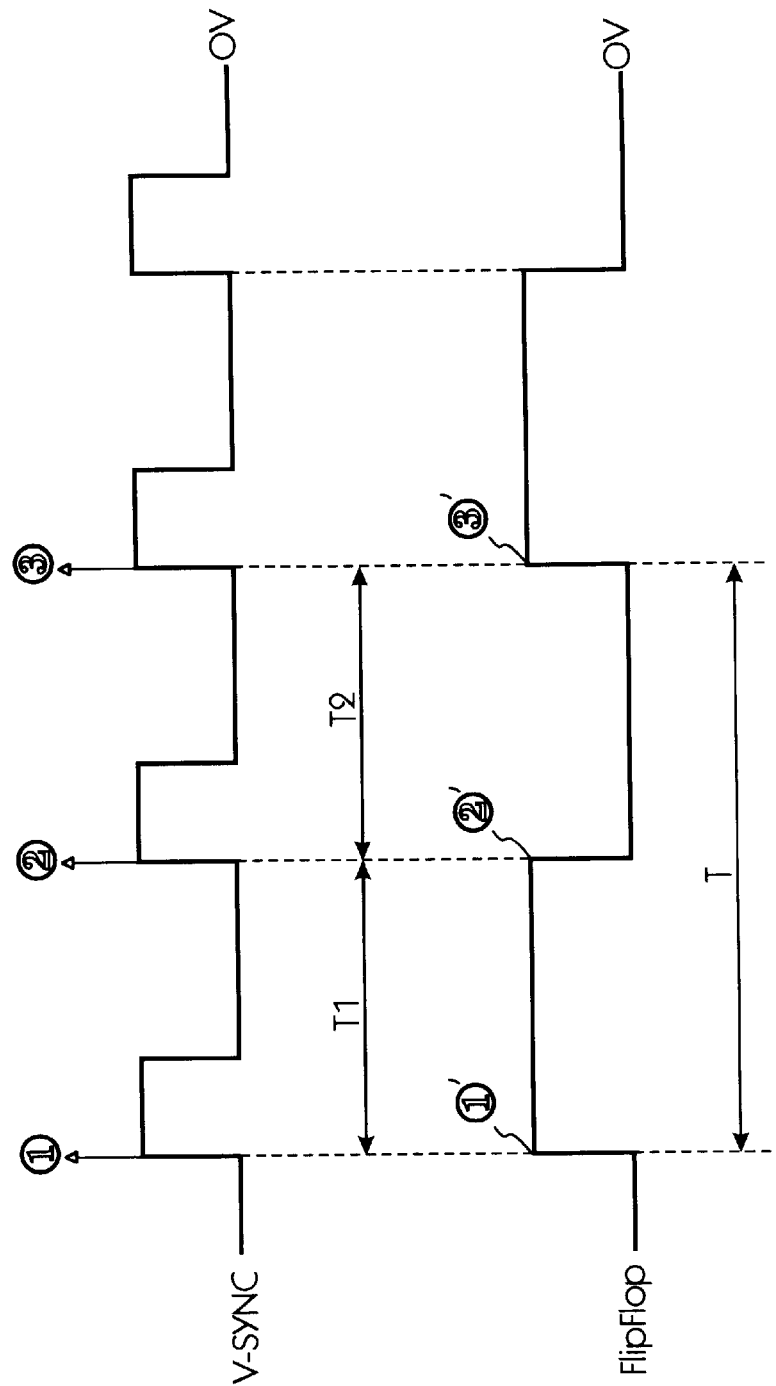
FIGS. 6A and 6B are waveform diagrams of the circuit section of each block as shown in FIG.5.

As shown in FIGS. 6A and 6B, the output signal of the flip-flop U1 is toggled at positions (1), (2) and (3) where the vertical synchronization signal V-SYNC transferred into the clock terminal of the first flip-flop U1 is triggered. Thus the flip-flop U1 generates the output signal by a period twice as long as the period of the vertical synchronization signal to corrects the Moire effect. The user can enable or disable the Moire clear circuit 70 as shown in FIG. 5 by controlling the clear terminal of the first flip-flop U1. For example, if an image makes a trembling movement due to a low vertical frequency with the Moire clear circuit 70 enabled, the first flip-flop U1 disables the Moire clear circuit 70.

Figure 7:
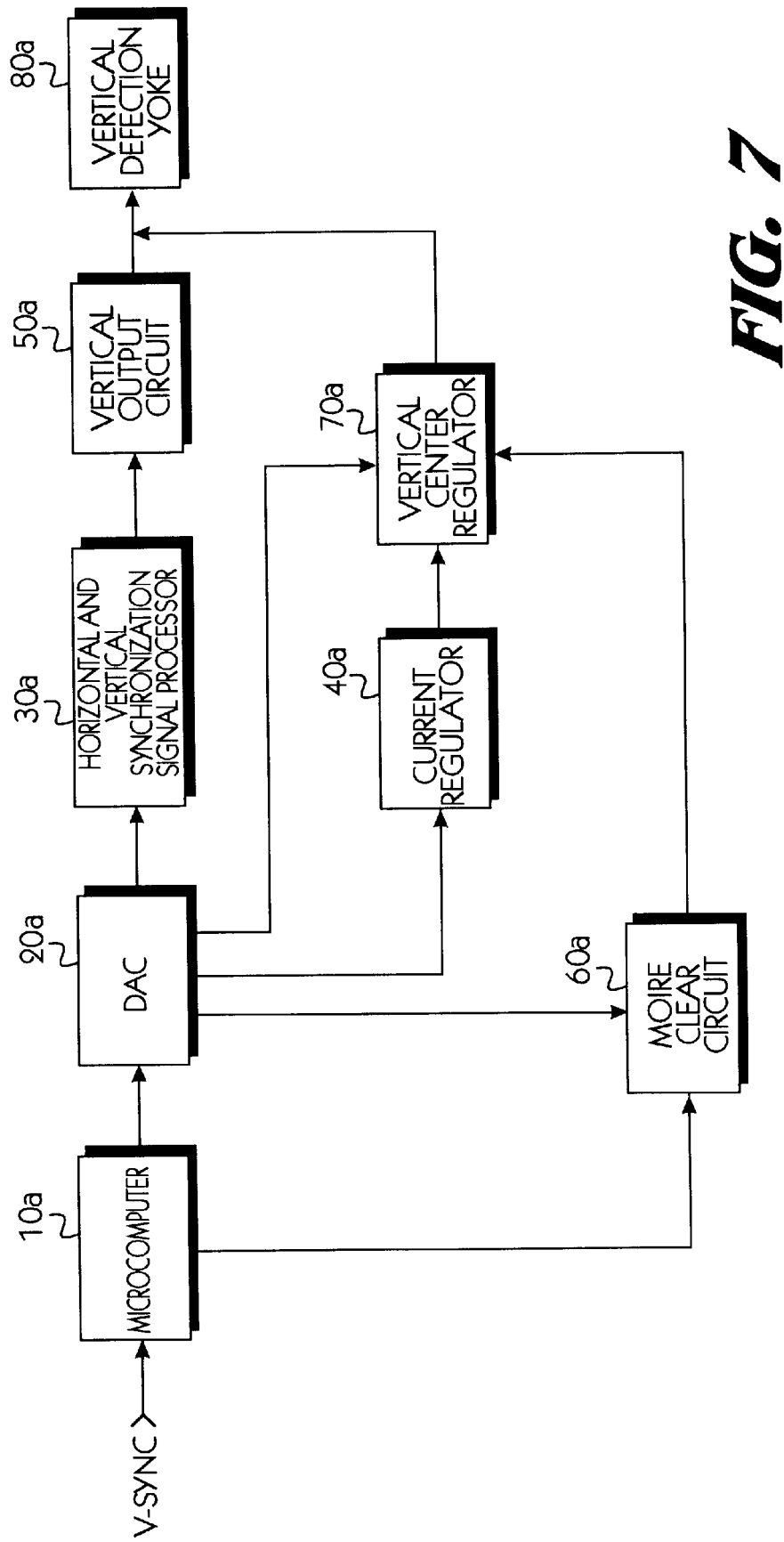
FIG. 7 is a block diagram of a vertical deflection circuit section constructed in accordance with a second preferred embodiment of the present invention.

Turn now to FIG. 7 which illustrates a vertical deflection circuit section constructed in accordance with a second preferred embodiment of the present invention. As shown in FIG. 7, the vertical deflection circuit section comprises a microcomputer 10a for receiving a vertical synchronization signal V-SYNC to synchronize the image signal generated from a video card (not shown) and generating a control signal according to the vertical synchronization signal V-SYNC, a digital-to-analog converter DAC 20a for converting the control signal received from the microcomputer 10a into an analog signal, a horizontal and vertical synchronization signal processor 30a for receiving a reference oscillation signal converted as an analog signal by the DAC 20a and controlling the switching speed of a sawtooth wave generator according to the vertical synchronization signal V-SYNC, a vertical output circuit 50a for generating a vertical sawtooth wave according to the switching signal received from the horizontal and vertical synchronization signal processor 30a, a current regulator 40a for regulating the current according to a moire control signal received from the DAC 20a, a Moire clear circuit 60a for receiving a moire enable signal MOIRE-ENABLE from the DAC 20a and converting the period of the vertical synchronization signal V-SYNC from the microcomputer 10a to generate a moire output signal MOIRE-OUT, a vertical center regulator 70a for receiving the current from the current regulator 40a and the moire output signal MOIRE-OUT from the Moire clear circuit 60a to change the size and direction of a vertical DC current, a vertical deflection yoke V-DY 80a for regulating the vertical center of an image according to the output signal of the vertical center regulator 70a and flowing the vertical sawtooth wave current applied by the vertical output circuit 50a in a coil to form a magnetic field, thereby determining the distance between an electron beam and an shadow mask and speed at which the electron beam reaches the shadow mask.

The operation of the vertical deflection circuit section of the CRT-type of display monitor will now be described with reference to FIG. 7 hereinbelow.

The video card installed in the computer system receives an image signal according to the input data and generates a horizontal and vertical synchronization signals H-SYNC and V-SYNC to synchronize the image signal. The horizontal and vertical signals H-SYNC and V-SYNC are transferred from the video card to the microcomputer 10a installed in the display monitor.

The microcomputer 10a discriminates the resolution of the image signal according to the horizontal and vertical signals H-SYNC and V-SYNC, and generates image adjusting signals to the DAC 20a, which converts the image adjusting signals from a digital format into analog image adjusting signals.

The horizontal and vertical synchronization signal processor 30a receives a reference oscillation signal from the analog image adjusting signals from the DAC 20a so as to generate a switching signal to the vertical output circuit 50a so as to control a switching time. The switching signal is transferred to the vertical output circuit 50a for generation of a sawtooth wave.

The current regulator 40a receives a moire control signal from the DAC 20a to control the amount of current flowing in the vertical center regulator 70a. The Moire clear circuit 60a receives the vertical synchronization signal V-SYNC from the microcomputer 10a and converts the period of the vertical synchronization signal V-SYNC according to a moire enable signal MOIRE-ENABLE from the microcomputer 10a.

The Moire clear circuit 60a converts a pulse of two periods of the vertical synchronization signal V-SYNC into that of one period. Thus period-converted moire output signal MOIRE-OUT is transferred into the vertical center regulator 70a that controls the amount of current by the current regulator 40a.

The vertical center regulator 70a, whose current is controlled by the moire clear signal and the current regulator 40a, changes the amount and direction of direct current (DC current) through the vertical deflection yoke V-DY 80a. The sawtooth wave current received by the vertical deflection yoke 80a forms a magnetic field according to the vertical center regulator 70a. thereby controlling the distance or velocity that the electron beam reaches a shadow mask to clear the Moire effect.

Figure 8:
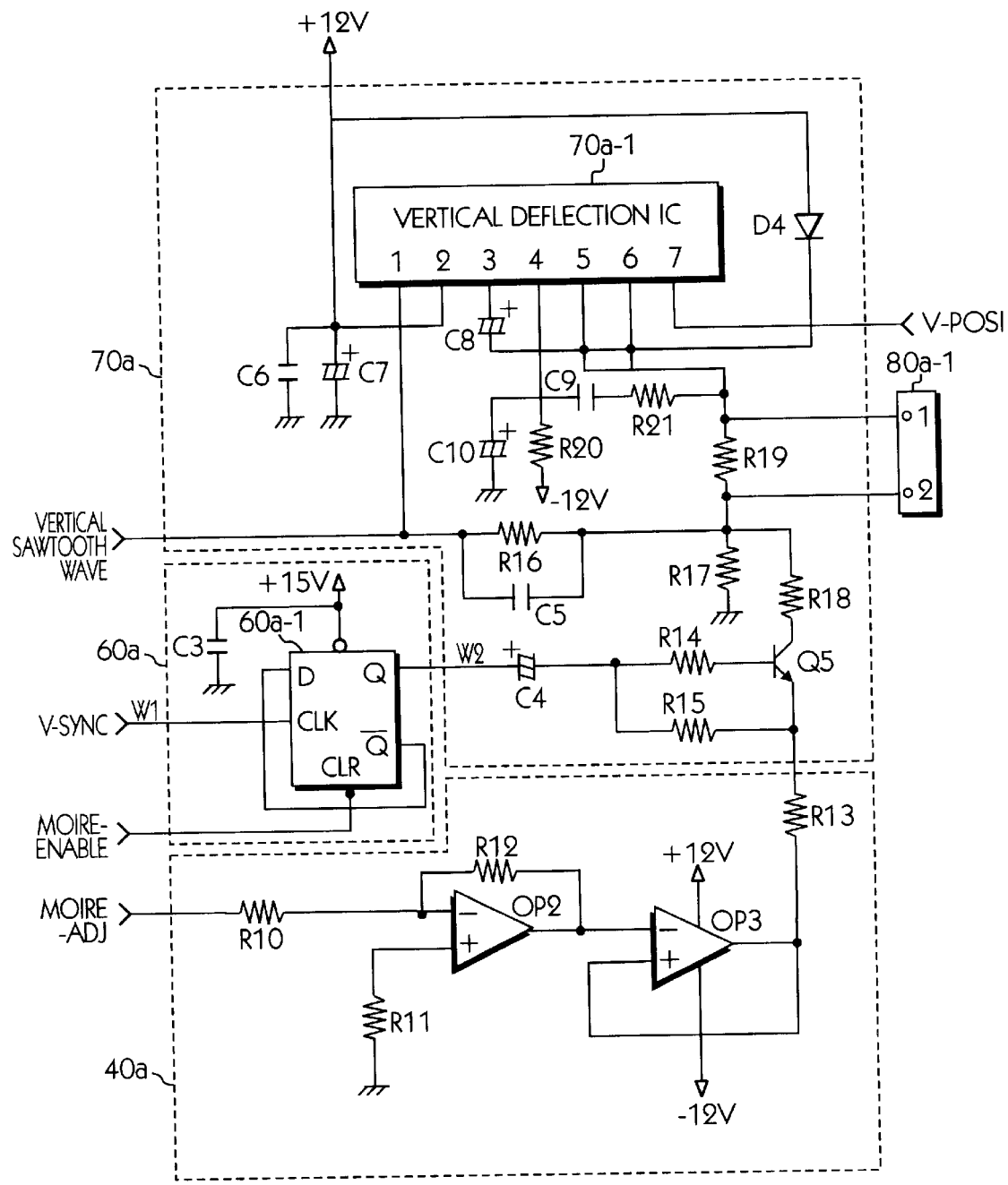
FIG. 8 is a detailed circuit diagram of the current regulator, Moire clear circuit and vertical center regulator as shown in FIG. 7.

FIG. 8 illustrates a detailed circuit diagram of the respective the current regulator 40a, Moire clear circuit 60a and vertical center regulator 70a of the vertical deflection circuit section as shown in FIG. 7. As shown in FIG. 8, the current regulator 40a comprises a second operational amplifier OP2 for comparing a moire adjusting signal MOIRE-ADJ with a grounded level signal to generate a first output signal; a third operational amplifier OP3 for receiving the first output signal from the second operational amplifier OP2 to generate a second output signal, and comparing the first and second output signals; and a plurality of resistances R10 to R13.

The Moire clear circuit 60a comprises a second flip-flop 60a-1 for receiving the vertical synchronization signal V-SYNC from the DAC 20a and the moire enable signal MOIRE-ENABLE to convert the two periods of the vertical synchronous signal V-SYNC into one period, and a capacitor C3.

The vertical center regulator 70a receives the moire adjusting signal MOIRE-ADJ and moire output signal MOIRE-OUT from the current regulator 40a and Moire clear circuit 60a, respectively. The vertical center regulator 70a comprises: a vertical deflection IC 70a-1 for receiving a vertical position regulating signal V-POSI from the DAC 20a in order to regulate the deflection angle of the electron beam and adjust a vertical raster; a fifth transistor Q5 turned on/off according to the moire out signal received from the Moire clear circuit 60a and regulating the amount of current according to the moire adjusting signal MOIRE-ADJ received from the current regulator; a plurality of resistances R14 to R21, a plurality of capacitors C4 to C10; and a diode D4.

The vertical deflection IC 70a-1 in the vertical center regulator 70a receives the vertical position adjusting signal V-POSI and sawtooth wave from the DAC 20a and vertical output circuit 50a through seventh and first pin thereof, respectively. The vertical deflection IC 70a-1 adjusts the vertical sawtooth wave according to the vertical position adjusting signal V-POSI through an input pin and generates the output signal through the output pin, that is, fifth pin. A DC voltage (+12V) is smoothed by capacitors C6 and C7 and fed into the vertical deflection IC 70a-1. The vertical deflection IC 70a-1 receives a negative voltage (−12V) through third, fifth and sixth pins via the capacitors C8, C9 and C10 and resistances R20 and R21. The vertical sawtooth wave is transferred from the vertical deflection IC 70a-1 into a vertical deflection yoke connector 80a-1 in the vertical deflection yoke 80a through a resistance R19, thereby changing the direction of vertically deflected scanning. Capacitor C9 and resistance R21 are used to eliminate noises.

A Moire clear function can be initiated when the user turns on a moire function switch (not shown) mounted on an external surface of the display monitor. The moire switch signal is applied to the microcomputer 10a as shown in FIG. 7, so that the microcomputer 10a generates a moire clear signal according to the moire switch signal. Upon receipt of the moire control signal from the microcomputer 10a, the DAC 20a converts a digital signal into an analog signal. Out of the moire control signal, the moire adjusting signal MOIRE-ADJ according to the regulating level signal is applied to the inverting terminal (−) of the second operational amplifier OP2 through the resistance R10 in the current regulator 40a.

A grounding voltage is supplied to the non-inverting terminal (+) of the second operational amplifier OP2 via the resistance R11. The second operational amplifier OP2 generates HIGH and LOW level signals according to the potential of the signal applied. The resistance R12 feeds back the first output signal of the second operational amplifier OP2. The first output signal is applied to the inverting terminal (−)

of the third operational amplifier OP3. With the first output signal from the second operational amplifier OP2, the third operational amplifier OP3 generates a second output signal.

The second output signal is applied to the non-inverting terminal (+) of the third operational amplifier OP3 and compared with the first output signal from the second operational amplifier OP2, thereby varying the bias voltage of the emitter of the fifth transistor Q5. The vertical synchronization signal V-SYNC is transferred from the microcomputer 10a into the clock terminal CLK of the second flip-flop 60a-1 to perform a triggering operation.

Out of the moire control signals received from the DAC 20a, the moire enable or disable signal MOIRE-ENABLE or MOIRE-DISABLE is transmitted into the clear terminal of the second flip-flop 60a-1. With the moire enable signal MOIRE-ENABLE, the second flip-flop 60a-1 delivers its output signal at a speed half the vertical synchronization signal V-SYNC, generating one pulse per two vertical pulses.

Figure 9:
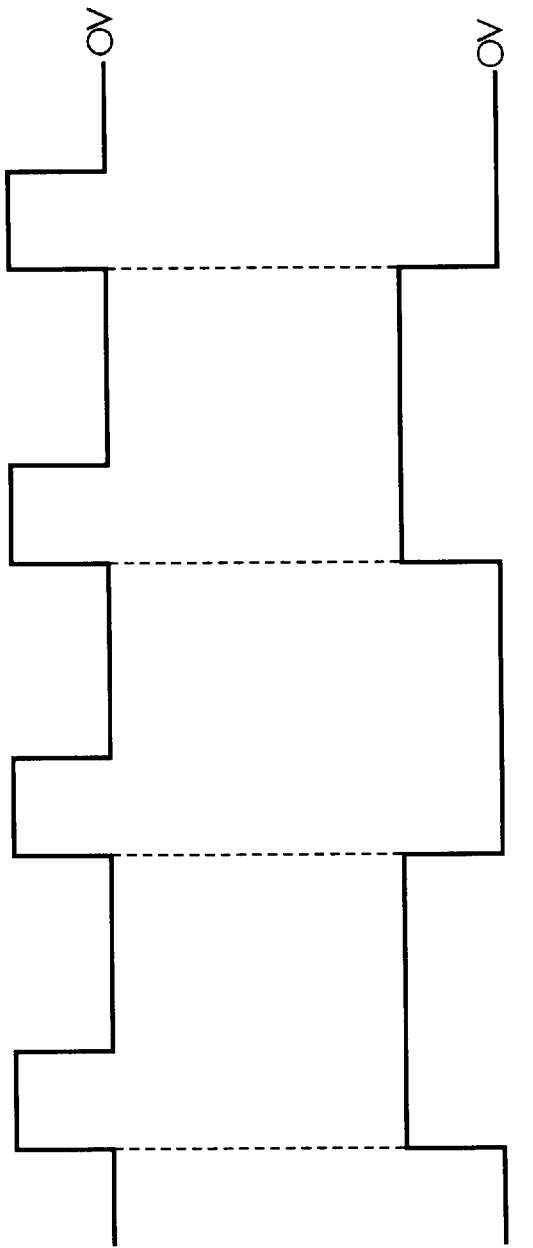
FIGS. 9A and 9B are waveform diagrams of output signals of respective circuit sections as shown in FIG. 8.

FIGS. 9A and 9B are waveform diagrams of the output signals of the respective circuit section of FIG. 8. As shown in FIG. 9, W1 is the waveform of the vertical synchronization signal V-SYNC applied from the microcomputer 10a (shown in FIG. 7) and W2 is of the moire output signal MOIRE-OUT generated after the period of the vertical synchronization signal V-SYNC is converted. At the rising edge position of the vertical synchronization signal V-SYNC, the output signal of the second flip-flop 60a-1 is toggled to have a period half the vertical period.

The moire output signal MOIRE-OUT delivered by the second flip-flop 60a-1 is transferred into the base of the transistor Q5 in the vertical center regulator 70a. The transistor Q5 passes the vertical sawtooth wave received from the vertical output circuit 50a in a designated frequency band through the resistance R16 and capacitor C5. The vertical sawtooth wave is fed into the collector of the transistor Q5, so that the transistor Q5 is turned on/off according to the period of the moire output signal MOIRE-OUT received from the second flip-flop 60a-1.

The output signal generated by the emitter of the transistor Q5 through a load resistance R13 is changed according to the second output signal received from the third operational amplifier OP3 in the current regulator 40a, thereby varying the amount of current applied to the vertical deflection yoke 80a. Accordingly, the reduction of the Moire effect can be controlled by changing the voltage applied to the non-inverting terminal (+) of the second operational amplifier OP2.

Figure 10:
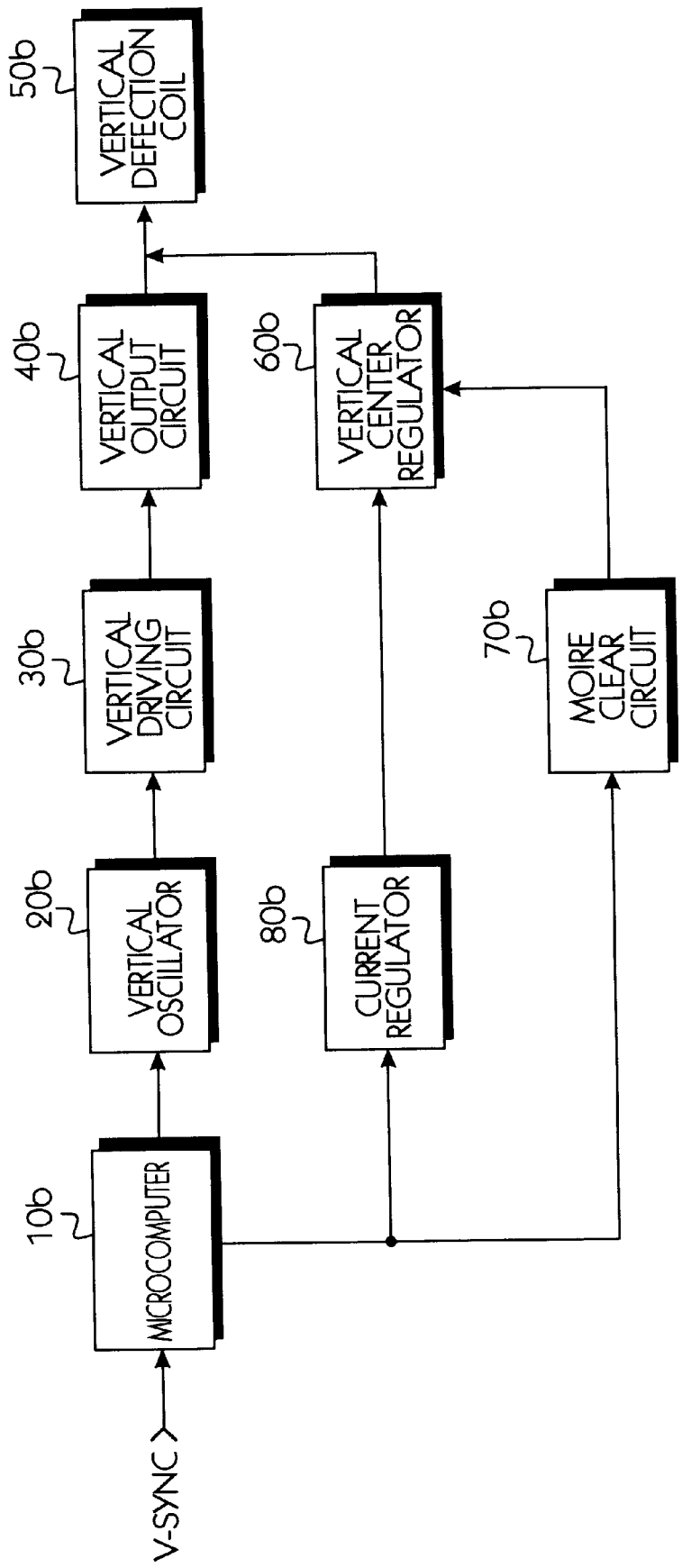
FIG. 10 is a block diagram of a vertical deflection circuit section constructed in accordance with a third preferred embodiment of the present invention.

FIG. 10 illustrates a vertical deflection circuit section of the CRT-type of display monitor as constructed in accordance with a third preferred embodiment of the present invention. Referring to FIG. 10, the vertical deflection circuit section comprises a microcomputer 10b for generating a designated DC current corresponding to a vertical frequency according to a vertical synchronization signal received through the video cable connected to a computer, a vertical oscillator or oscillation circuit 20b for generating a sawtooth wave by charging or discharging a capacitor using the output voltage of the microcomputer 10b, a vertical output circuit 40b for generating a linear deflection current by using a mirror integration, a vertical driving circuit 30b for maintaining a constant central voltage of the vertical output circuit 40b, a vertical deflection coil 50b for forming a magnetic field by flowing the current applied from the vertical output circuit 40b in a coil to control the distance between an electron beam and an shadow mask and speed at which the electron beam reaches the shadow mask, a vertical center regulator 60b for regulating the vertical center of an image displayed by overlapping the DC current with the vertical deflection coil and varying the size and direction of the DC current, a Moire clear circuit 70b for regulating the operational period of the vertical center regulator 60b by using a period as long as two times the period of the vertical synchronization signal to attenuate a moire effect, and a current regulator 80b connected to the vertical center regulator 60b and Moire clear circuit 70b to control the amount of current flowing in the vertical center regulator 60b.

Figure 11:
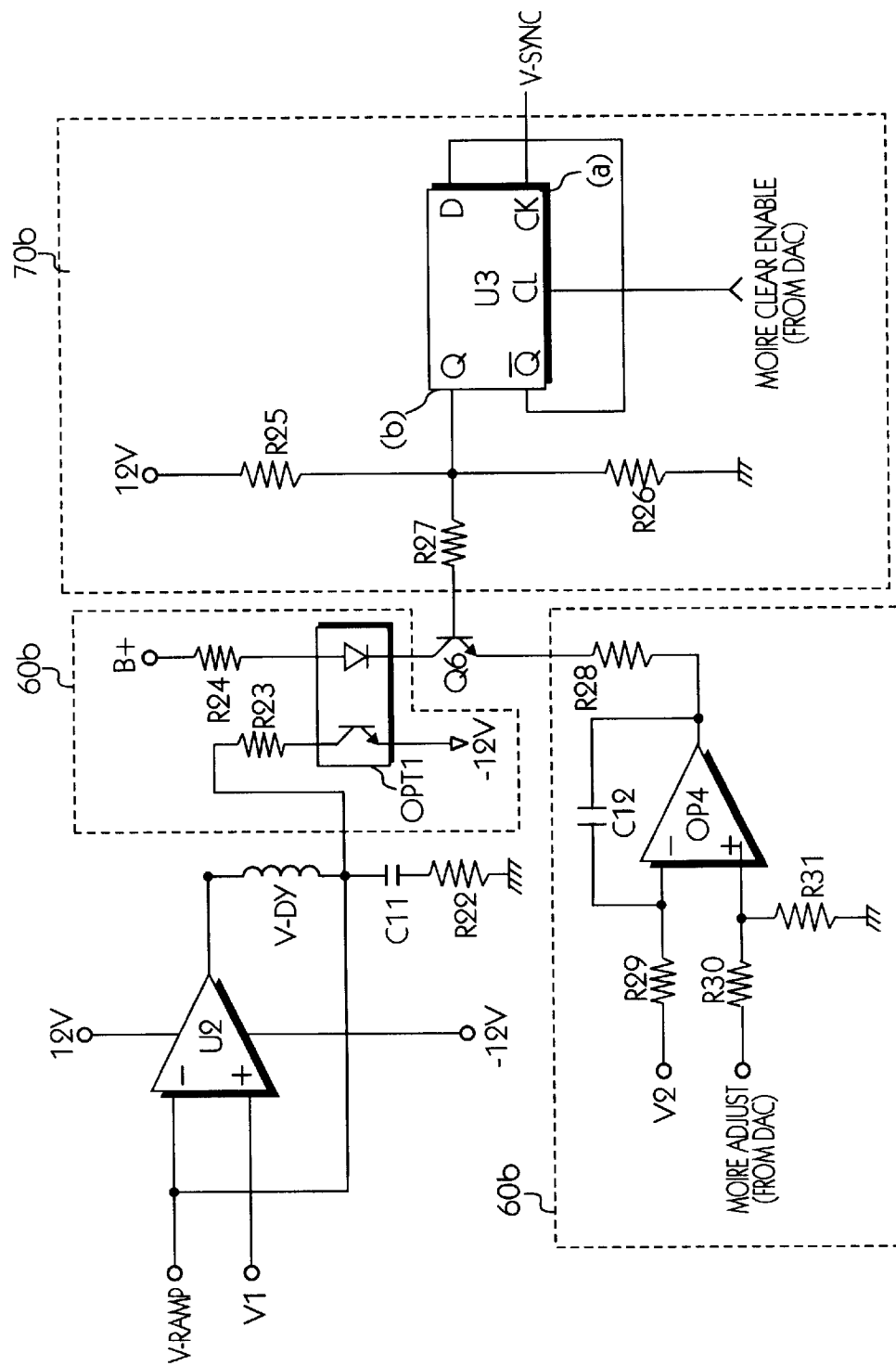
FIG. 11 is a detailed circuit diagram of the respective circuit blocks as shown in FIG. 9.

FIG. 11 is a detailed circuit diagram of the respective vertical output circuit 40b, vertical center regulator 60b, Moire clear circuit 70b and current regulator 80b of FIG. 10. As shown in FIG. 11, the vertical output circuit 40b comprises a vertical output amplifier U2 having an inverting terminal (−) for receiving a vertical output ramp waveform V-ramp and a non-inverting terminal (+) for receiving an operational voltage V1, a vertical deflection yoke V-DY for receiving the output voltage of the vertical output amplifier U2, and capacitor C11 and resistance R22 connected to the vertical deflection yoke V-DY.

The Moire clear circuit 70b comprises a third flip-flop U3 having a clock terminal for receiving the vertical synchronization signal V-SYNC and a clock terminal for receiving a moire clear enable/disable control signal intended by a user, thereby generating the output pulse of one period per two period of the vertical synchronization signal; and resistances R25, R26 and R27 for dividing the output voltage of the third flip-flop U3.

The output signal of the Moire clear circuit 70b is divided by the resistances R25, R26 and R27 and applied to the base of the switching transistor Q6. The vertical center regulator 60b is connected to a resistance R23 for delivering a vertical center regulating signal to the deflection yoke V-DY and capacitor C11, and an opto-coupler OPT1 for receiving the output voltage of the collector of the switching transistor Q6 and converting the voltage level applied to the vertical deflection yoke V-DY to change the direction of the current. A transformer can be used instead of the opto-coupler.

The emitter of the switching transistor Q6 is connected to the output of the comparator OP4 to regulate the current flowing in the switching transistor Q6, through the resistance R28. The comparator OP4 has an inverting terminal (−) connected to a resistance R29 to transfer a reference voltage V2 and a non-inverting terminal (+) connected to resistances R30 and R31 to divide a moire clear adjusting voltage received from the microcomputer 10b (shown in FIG. 10). A capacitor C12 is connected between the inverting terminal (-) and the output terminal.

The Moire clear circuit 70b generates an output signal to generate the switching operation of the switching transistor Q6 by enabling the third flip-flop U3. The third flip-flop U3 triggers the vertical synchronization signal V-SYNC, so that the output Q of the third flip-flop U3 generates a HIGH or LOW output signal depending on the vertical period.

When the input signal applied to the clear terminal CL of the third flip-flop U3 is enabled, the switching transistor Q6 is switched at a speed half the period of the vertical synchronization signal V-SYNC, that is, one output pulse per two vertical pulses. The moire clear adjusting voltage, that is, the voltage applied to the non-inverting terminal (+) of the comparator OP4 is changed so as to control the decrease of the moire.

The third flip-flop U3 is a D type flip-flop that generates a toggled output signal at the edge position where the input signal is converted from LOW to HIGH. The vertical synchronization signal V-SYNC fed into the clock terminal of the third flip-flop U3 is shown in FIG. 6A. The output signal of the third flip-flop U3 is toggled at positions (1)', (2)' and (3)' corresponding to the rising edge positions (1), (2) and (3) of the vertical synchronization signal V-SYNC, thereby delivered by a period half the vertical period.

A moire clear enable/disable toggling signal is transmitted to the clear terminal of the third flip-flop U3. A selection signal to enable or disable the Moire clear circuit is then received to prevent the image from trembling with a log vertical frequency when the Moire clear circuit is enabled. The collector voltage of the switching transistor Q6 is changed by the DC voltage applied to the base of the switching transistor Q6. The opto-coupler OPT1 changes the voltage level of the current, thereby converting the vertical output center at a speed half the vertical period. The current flowing in the switching transistor Q6 is controlled by the comparator OP4. The bias voltage of the emitter is changed according to the output signal of the comparator OP4 to regulate the amount of current flowing from the emitter to collector.

Figure 12:
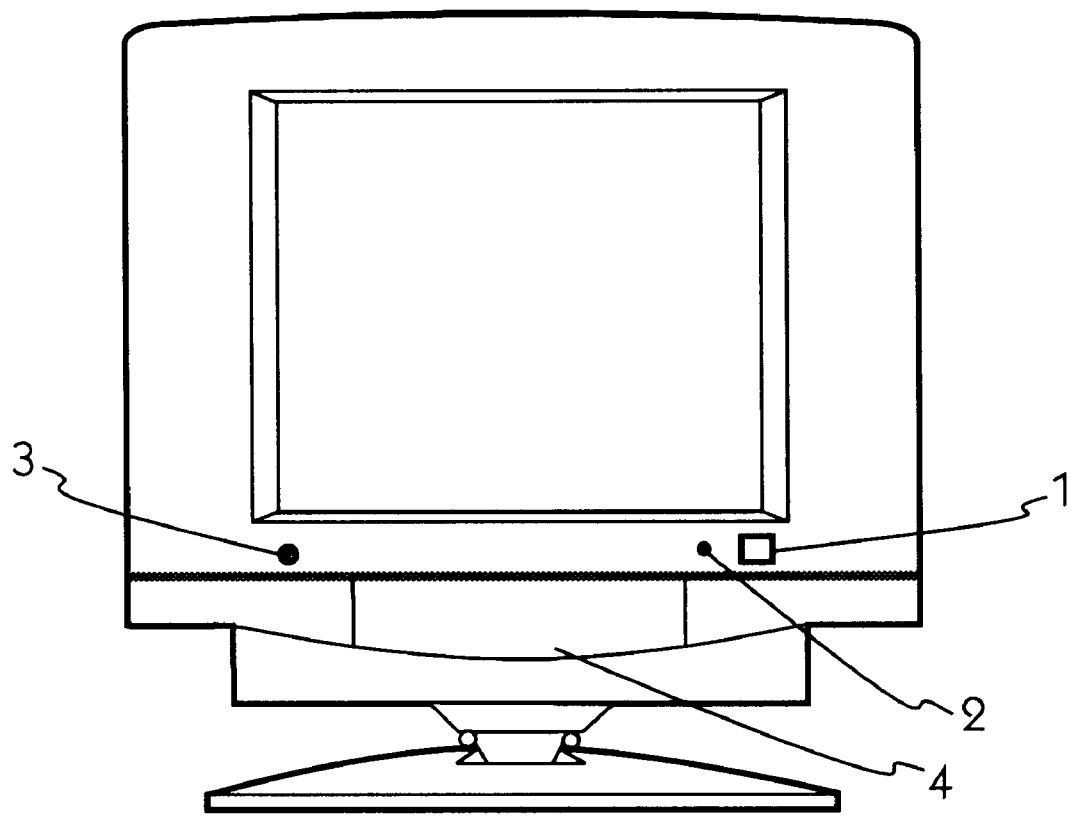
FIG. 12 illustrates a front view of a CRT-type of display monitor of the present invention.

Refer now to FIG. 12, which illustrates a front view of a CRT-type of display monitor of the present invention. The display monitor comprises a power switch 1 for supplying a power to the display monitor, a luminescent diode ramp 2 for indicating that the power is applied to the monitor, a control box 4 for adjusting the image on the monitor, and a moire selection switch 3.

The moire selection switch 3 is used to allow the user to enable or disable the Moire clear circuit when the Moire clear circuit (70; as shown in FIG. 4) is enabled and the image is trembled with a low vertical frequency.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A Moire clear circuit of a display device, comprising:
    a vertical center regulating circuit connected to a vertical deflection coil of a vertical output circuit, for determining the direction of a current flowing in the vertical deflection coil to regulate a vertical center of an image displayed on a screen, said vertical center regulating circuit comprising:
        a first transistor having a base coupled to receive a vertical center regulating signal and an emitter coupled to receive a moire clear signal to determine whether to be turned on or not, and
        a signal converting section for changing the direction of the current flowing in the vertical deflection coil according to a voltage applied to a collector of the first transistor; and
    a Moire clear regulating circuit connected to the vertical center regulating circuit to trigger a vertical synchronization signal received therefrom and turning on/off a signal applied to the vertical center regulating circuit according to a vertical period to move the vertical center up and down, said Moire clear regulating circuit comprising:
        a first flip-flop having a clock terminal coupled to receive the vertical synchronization signal, and a clear terminal coupled to receive a moire clear enable signal to generate an output signal varying according to the vertical period; and
        a second transistor having a base coupled to receive the output signal of the first flip-flop, and a collector connected to the emitter of the first transistor to change a bias resistance of the emitter of the first transistor.

2. A Moire clear circuit of a display device, comprising:
    a vertical center regulating circuit connected to a vertical deflection coil of a vertical output circuit, for determining the direction of a current flowing in the vertical deflection coil to regulate a vertical center of an image displayed on a screen, said vertical center regulating circuit comprising:
        a first transistor having a base coupled to receive a vertical center regulating signal and an emitter coupled to receive a moire clear signal to determine whether to be turned on or not, and
        a signal converting section for changing the direction of the current flowing in the vertical deflection coil according to a voltage applied to a collector of the first transistor, said signal converting section comprising:
            a second transistor having a base connected to the collector of the first transistor, and a collector connected to the vertical deflection coil, and
            a third transistor having an emitter connected to a connection point between the collector of the second transistor and the vertical deflection coil, a base connected to the collector of the first transistor, and a collector applied with a power voltage; and
    a Moire clear regulating circuit connected to the vertical center regulating circuit to trigger a vertical synchronization signal received therefrom and turning on/off the signal applied to the vertical center regulating circuit according to a vertical period to move the vertical center up and down.

3. The Moire clear circuit of claim 1, wherein the clear terminal of the first flip-flop generates the output signal in dependence upon reception of either the moire clear enable signal or a moire clear disable signal.

4. A Moire clear system of a display device, comprising:
    a micro-computer coupled to receive a vertical synchronization signal, for generating a plurality of control signals including at least a moire adjusting signal, a reference oscillation signal, and a moire enable signal;
    a current regulator coupled to receive the moire adjusting signal, for regulating an amount of current flowing therein, said current regulator comprising:
        a first operational amplifier for comparing the moire adjusting signal with a grounded level signal to generate a first amplifier signal and
        a second operational amplifier for receiving the first amplifier signal to generate a second amplifier signal and for comparing the first amplifier signal with the second amplifier signal;
    a Moire clear circuit coupled to receive the vertical synchronization signal, for converting a period of the vertical synchronization signal in response to the moire enable signal to generate a moire output signal said Moire clear circuit comprising a flip-flop having a clock terminal coupled to receive the vertical synchronization signal and a data terminal for generating a vertical synchronization signal in which two periods become one in response to reset from the moire enable signal;

a vertical center regulator coupled to receive the amount of current regulated by the current regulator and the moire output signal from the Moire clear circuit, for changing an amount and a direction of a vertical direct current (DC current) to regulate a vertical center of an image displayed on a screen, said vertical center regulator comprising:

a vertical deflection counter coupled to receive a vertical position regulating signal from the microcomputer, for controlling a deflection angle of an electron beam and adjusting a vertical raster, and a transistor turned on/off according to the moire output signal received from the Moire clear circuit, for regulating the amount of current according to the moire adjusting signal; and a vertical deflection yoke for making a vertical sawtooth wave current applied from a vertical output circuit flow in a coil to form a magnetic field according to the change in the amount and direction of the vertical DC current to control a distance and a speed of the electron beam as the electron beam reaches a shadow mask to clear a Moire effect.

5. A Moire clear system of a display device, comprising:

a micro-computer coupled to receive a vertical synchronization signal for generating a plurality of control signals including at least a moire adjusting signal, a reference oscillation signal, and a moire enable signal;

a current regulator coupled to receive the moire adjusting signal, for regulating an amount of current flowing therein said current regulator comprising:

a first operational amplifier for comparing the moire adjusting signal with a grounded level signal to generate a first amplifier signal, and a second operational amplifier for receiving the first amplifier signal to generate a second amplifier signal and for comparing the first amplifier signal with the second amplifier signal;

a Moire clear circuit coupled to receive the vertical synchronization signal, for converting a period of the vertical synchronization signal in response to the moire enable signal to generate a moire output signal;

a vertical center regulator coupled to receive the amount of current regulated by the current regulator and the moire output signal from the Moire clear circuit, for changing an amount and a direction of a vertical direct current (DC current) to regulate a vertical center of an image displayed on a screen; and a vertical deflection yoke for making a vertical sawtooth wave current applied from a vertical output circuit flow in a coil to form a magnetic field according to the change in the amount and direction of the vertical DC current to control a distance and a speed of an electron beam as the electron beam reaches a shadow mask to clear a Moire effect.

6. A Moire clear system of a display device, comprising:

a micro-computer coupled to receive a vertical synchronization signal, for generating a plurality of control signals including at least a moire adjusting signal, a reference oscillation signal, and a moire enable signal;

a current regulator coupled to receive the moire adjusting signal, for regulating an amount of current flowing therein;

a Moire clear circuit coupled to receive the vertical synchronization signal, for converting a period of the vertical synchronization signal in response to the moire enable signal to generate a moire output signal, said Moire clear circuit comprising a flip-flop having a clock terminal coupled to receive the vertical synchronization signal and a data terminal for generating a vertical synchronization signal in which two periods become one in response to reset from the moire enable signal;

a vertical center regulator coupled to receive the amount of current regulated by the current regulator and the moire output signal from the Moire clear circuit, for changing an amount and a direction of a vertical direct current (DC current) to regulate a vertical center of an image displayed on a screen; and a vertical deflection yoke for making a vertical sawtooth wave current applied from a vertical output circuit flow in a coil to form a magnetic field according to the change in the amount and direction of the vertical DC current to control a distance and a speed of an electron beam as the electron beam reaches a shadow mask to clear a Moire effect.

7. A Moire clear system of a display device comprising:

a micro-computer coupled to receive a vertical synchronization signal for generating a plurality of control signals including at least a moire adjusting signal, a reference oscillation signal, and a moire enable signal;

a current regulator coupled to receive the moire adjusting signal, for regulating an amount of current flowing therein;

a Moire clear circuit coupled to receive the vertical synchronization signal for converting a period of the vertical synchronization signal in response to the moire enable signal to generate a moire output signal;

a vertical center regulator coupled to receive the amount of current regulated by the current regulator and the moire output signal from the Moire clear circuit, for changing an amount and a direction of a vertical direct current (DC current) to regulate a vertical center of an image displayed on a screen said vertical center regulator comprising:

a vertical deflection counter coupled to receive a vertical position regulating signal from the microcomputer, for controlling a deflection angle of an electron beam and adjusting a vertical raster, and a transistor turned on/off according to the moire output signal received from the Moire clear circuit, for regulating the amount of current according to the moire adjusting signal; and a vertical deflection yoke for making a vertical sawtooth wave current applied from a vertical output circuit flow in a coil to form a magnetic field according to the change in the amount and direction of the vertical DC current to control a distance and a speed of the electron beam as the electron beam reaches a shadow mask to clear a Moire effect.

8. A Moire clear circuit of a display device, comprising:

a moire clear regulator for triggering a vertical synchronization signal whose vertical period thereby becomes half;

a switching transistor turned on/off according to an output signal of the moire clear regulator, for determining the direction of a current flowing in a vertical deflection yoke;

a vertical center regulator for coupling current flowing in the switching transistor with a vertical output circuit;

a current regulator for controlling the current flowing in the switching transistor; and a flip-flop having a clock terminal coupled to receive the vertical synchronization signal and a clear terminal coupled to receive a moire clear enable signal, for varying the output signal according to a vertical period.

9. The Moire clear circuit of claim 8, wherein said clear terminal is for resetting operation of said flip-flop in accordance with said moire clear enable signal.

10. The Moire clear circuit of claim 8, wherein said vertical center regulator comprises an optocoupler turned on/off according to a switching operation of the switching transistor.

* * * * *